United States Patent
Wang et al.

(10) Patent No.: US 9,237,336 B2
(45) Date of Patent: Jan. 12, 2016

(54) LIQUID CRYSTAL DISPLAY FOR DISPLAYING TWO-DIMENSIONAL/THREE-DIMENSIONAL IMAGES AND METHOD THEREOF

(75) Inventors: Chih-Chieh Wang, Hsin-Chu (TW); Yu-Chieh Chen, Hsin-Chu (TW)

(73) Assignee: AU Optronics Corp., Science-Based Industrial Park, Hsin-Chu (TW)

(*) Notice: Subject to any disclaimer, the term of this patent is extended or adjusted under 35 U.S.C. 154(b) by 382 days.

(21) Appl. No.: 13/448,404

(22) Filed: Apr. 17, 2012

(65) Prior Publication Data

US 2013/0127835 A1     May 23, 2013

(30) Foreign Application Priority Data

Nov. 18, 2011   (TW) .............................. 100142427 A (51) Int. Cl.
*G09G 3/36*      (2006.01)
*G06T 15/00*     (2011.01)
*H04N 13/04*     (2006.01)

(52) U.S. Cl.
CPC ............. *H04N 13/0404* (2013.01); *G09G 3/36* (2013.01); *G09G 3/3622* (2013.01); *H04N 13/0456* (2013.01)

(58) Field of Classification Search
CPC ....................................................... G09G 3/36
USPC ........................................................... 345/87
See application file for complete search history.

(56) References Cited

U.S. PATENT DOCUMENTS

| | | | |
|---|---|---|---|
| 6,157,424 A | 12/2000 | Eichenlaub | |
| 2008/0074742 A1* | 3/2008 | Kim et al. | 359/463 |
| 2009/0040202 A1* | 2/2009 | Park | 345/204 |
| 2012/0146994 A1* | 6/2012 | Jeong et al. | 345/419 |

FOREIGN PATENT DOCUMENTS

| | | |
|---|---|---|
| TW | 567388 | 12/2003 |
| TW | 201018228 | 5/2010 |
| TW | 201023128 | 6/2010 |

\* cited by examiner

*Primary Examiner* — Mark Regn
(74) *Attorney, Agent, or Firm* — Winston Hsu; Scott Margo (57) ABSTRACT

A liquid crystal display includes a display panel, a processor, a timing control circuit, and a switch cell layer. The switch cell layer includes a liquid crystal layer, a first driving circuit, and a second driving circuit. The switch cell layer is installed on the display panel. When the display panel displays at least one two-dimensional region and at least one three-dimensional region according to an image signal, the processor determines positions of the at least one two-dimensional region and the at least one three-dimensional region on the display panel according to the image signal. The timing control circuit is for generating an address signal according to the positions. The first driving circuit and the second driving circuit drive first enable lines coupled to the first driving circuit in groups and second enable lines coupled to the second driving circuit in groups respectively according to the address signal.

19 Claims, 12 Drawing Sheets

LIQUID CRYSTAL DISPLAY FOR DISPLAYING TWO-DIMENSIONAL/THREE-DIMENSIONAL IMAGES AND METHOD THEREOF

BACKGROUND OF THE INVENTION

1. Field of the Invention

The present invention relates to a liquid crystal display, particularly to a liquid crystal display that displays a 2D/3D region through enabling a plurality of second enable lines coupled to a second driving circuit and a plurality of first enable lines coupled to a first driving circuit in groups.

2. Description of the Prior Art

Figure 1:
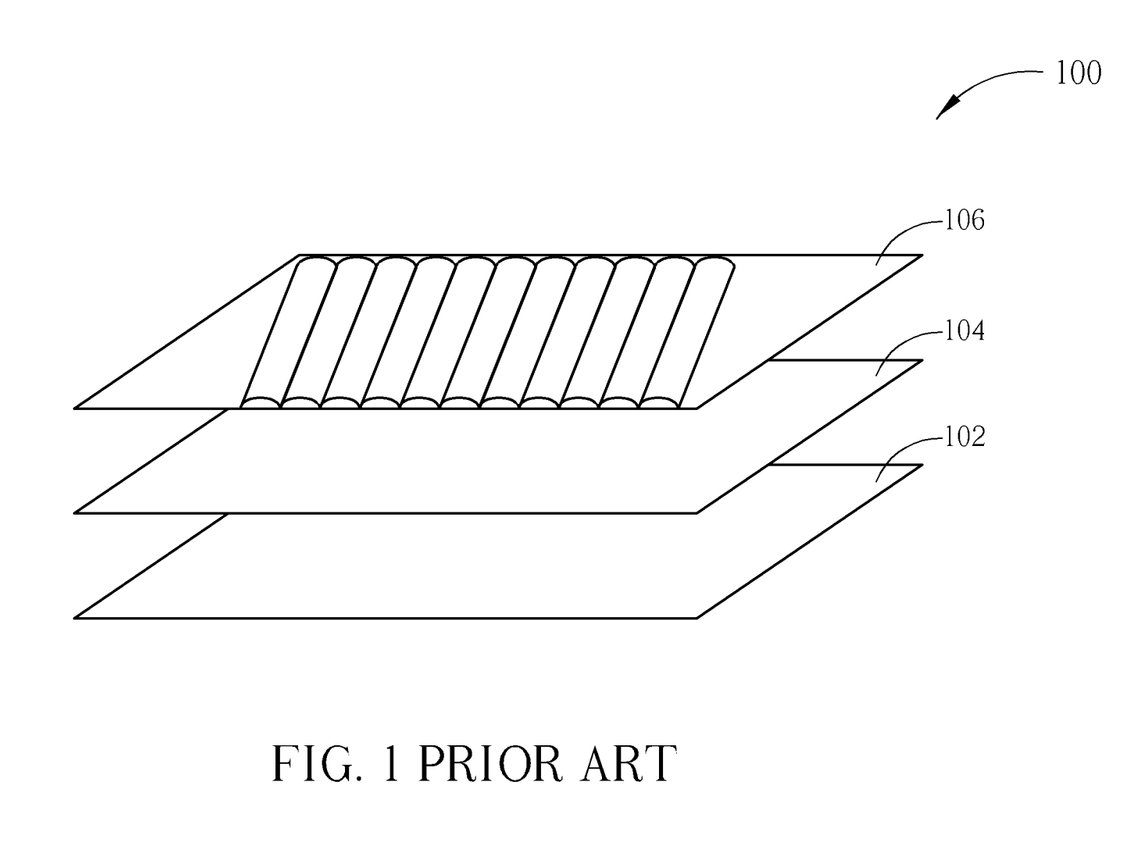
FIG. 1 is a diagram of a liquid crystal display capable of displaying a 2D/3D region.

Please refer to FIG. 1, which is a diagram of a liquid crystal display 100 capable of displaying a 2D/3D region. As shown in FIG. 1, liquid crystal display 100 comprises display panel 102, switch cell (SW) 104 and lenticular lens layer 106. When liquid crystal display 100 displays a 3D region, it acts as an automatic 3D display, and liquid crystal display 100 displays a 2D region or 3D region by controlling liquid crystal molecule twisting angle in switch cell 104 and using lenticular lens layer 106.

Figure 2A:
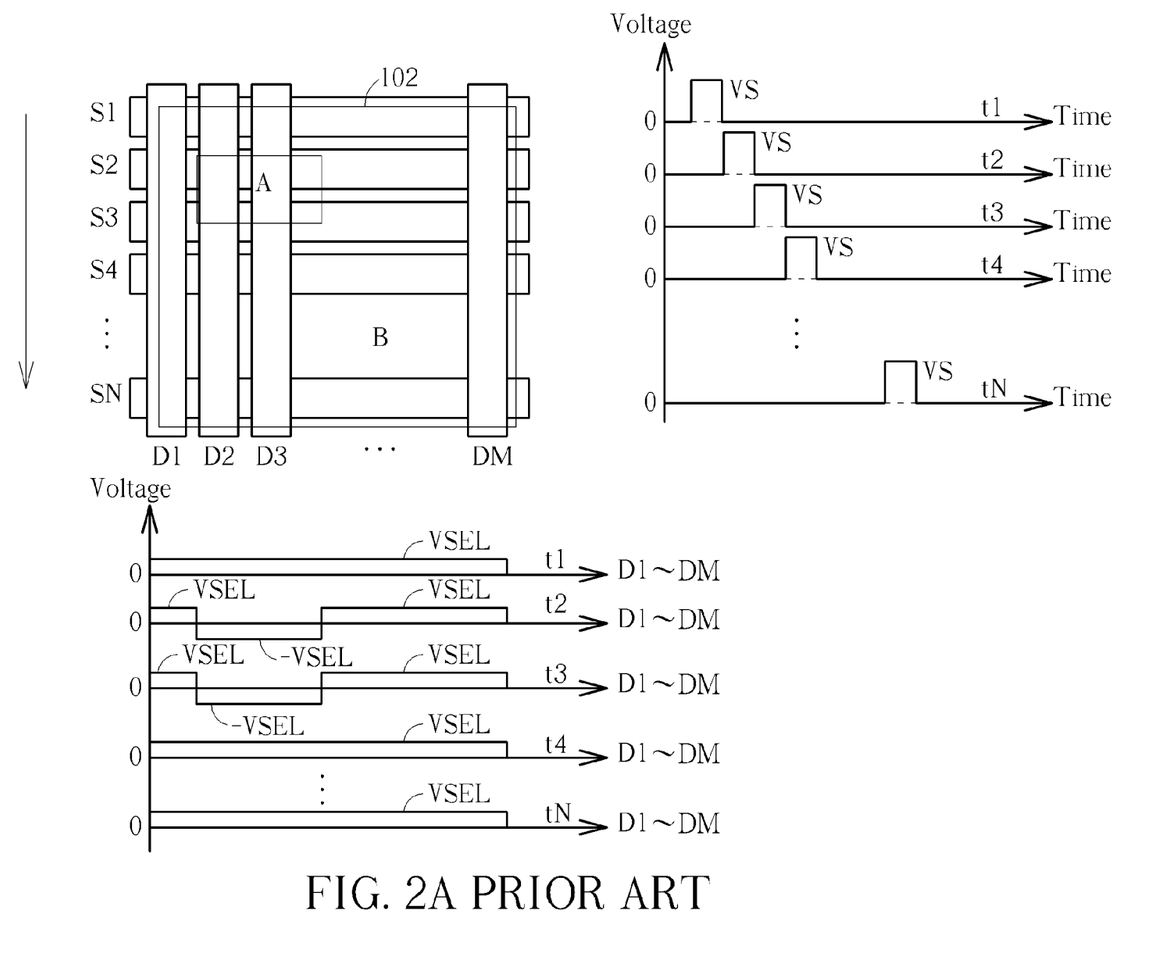
FIG. 2A is a diagram illustrating a driving method of switch cell.
Figure 2B:
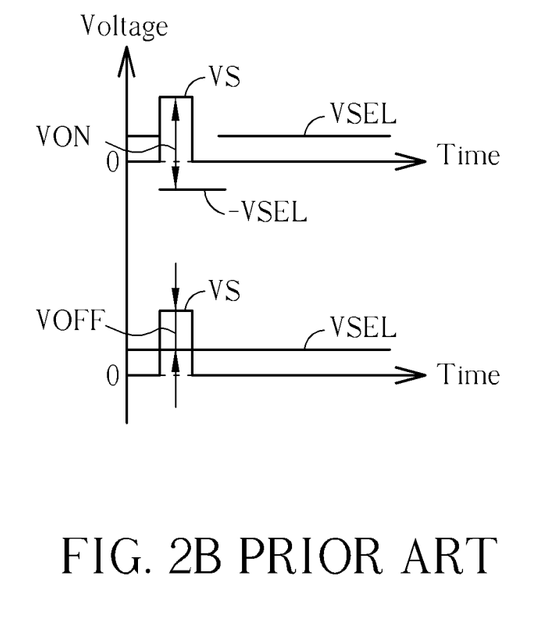
FIG. 2B is a diagram illustrating first voltage corresponding to region A and second voltage corresponding to region B of FIG. 2A.
Figure 2C:
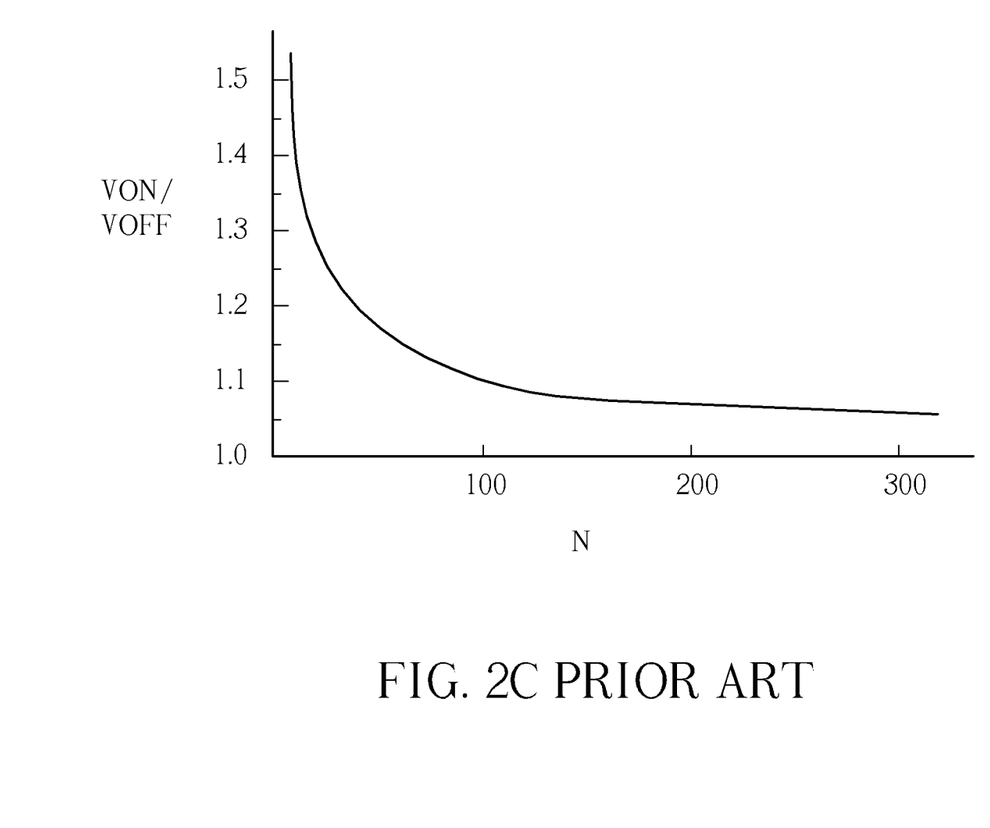
FIG. 2C is a diagram illustrating relationship between voltage selection ratio (VON/VOFF) and switch cell resolution.

Please refer to FIG. 2A, FIG. 2B, and FIG. 2C. FIG. 2A is a diagram illustrating a driving method of switch cell 104. FIG. 2B is a diagram illustrating first voltage VON corresponding to region A and second voltage VOFF corresponding to region B of FIG. 2A, where region A is used for displaying a 3D region, and region B is used for displaying a 2D region. FIG. 2C is a diagram illustrating relationship between voltage selection ratio (VON/VOFF) and switch cell 104 resolution. As shown in FIG. 2A, second enable lines S1-SN of switch cell 104 are enabled sequentially, where t1-tN are times corresponding to second enable lines S1-SN, and N is a positive integer. When second enable lines S2 (time t2), S3 (time t3) corresponding to region A and region B are enabled, first enable lines of first enable lines D1-DM corresponding to region A receive a low voltage −VSEL, and first enable lines of first enable lines D1-DM corresponding to region B receive a high voltage VSEL, where M is a positive integer. Further, as shown in FIG. 2A, because second enable lines S1, S4-SN do not correspond to region A, when second enable lines S1, S4-SN are enabled, first enable lines D1-DM all receive high voltage VSEL. As shown in FIG. 2B, first voltage VON corresponding to region A is voltage difference between low voltage −VSEL and voltage VS enabling second enable lines S1-SN, and second voltage VOFF corresponding to region B is voltage difference between high voltage VSEL and voltage VS enabling second enable lines S1-SN (the above signals invert polarity during polarity inversion). As shown in FIG. 2C, with increased switch cell 104 resolution (higher number N of second enable lines), voltage selection ratio approaches closer to 1. In other words, difference between root mean square of first voltage VON and root mean square of second voltage VOFF decreases. Thus, because difference between liquid crystal twisting angles of region A and region B of switch cell 104 is not large, boundary between region A and region B exhibits cross talk. Particularly, when switch cell 104 is a twisted nematic liquid crystal, crosstalk becomes especially noticeable, because voltage selection ratio to resolution curve has gentle slope, and voltage selection ratio approaches 1 when resolution is high.

SUMMARY OF THE INVENTION

According to an embodiment, a liquid crystal display (LCD) for displaying two-dimensional/three-dimensional (2D/3D) images comprises a display panel for receiving an image signal, and displaying at least one 2D region and at least one 3D region according to the image signal, a processor for determining positions of the at least one 2D region and the at least one 3D region on the display panel according to the image signal, a timing control circuit for generating an address signal according to the positions of the at least one 2D region and the at least one 3D region on the display panel, and a switch cell layer installed on the display panel. The switch cell layer comprises a liquid crystal layer, a first conductive layer comprising a first driving circuit for enabling a plurality of first enable lines coupled to the first driving circuit in groups according to the address signal, and a second conductive layer comprising a second driving circuit for enabling a plurality of second enable lines coupled to the second driving circuit in groups according to the address signal. The liquid crystal layer is positioned between the first conductive layer and the second conductive layer, and enabling the plurality of first enable lines and the plurality of second enable lines in groups according to the address signal to control at least one of the 2D and 3D regions of the liquid crystal layer.

According to an embodiment, a method of displaying 2D/3D images in an LCD comprises receiving an image signal, determining positions of at least one 2D region and at least one 3D region on a display panel according to the image signal, generating an address signal according to the positions of the at least one 2D region and the at least one 3D region on the display panel, enabling a plurality of second enable lines coupled to the second driving circuit in groups according to the address signal by a second driving circuit, and enabling a plurality of first enable lines coupled to the first driving circuit in groups according to the address signal by a first driving circuit.

These and other objectives of the present invention will no doubt become obvious to those of ordinary skill in the art after reading the following detailed description of the preferred embodiment that is illustrated in the various figures and drawings.

DETAILED DESCRIPTION

The embodiments describe a liquid crystal display for displaying a 2D/3D region. The liquid crystal display comprises display panel, processor, timing control circuit, and switch cell. The display panel is used for receiving image signals, and displaying at least one 2D region and at least one 3D region according to the image signals. The processor is used for determining locations of the at least one 2D region and the at least one 3D region on the display panel according to the image signals. The timing control circuit is for generating an address signal according to the locations of the at least one 2D region and the at least one 3D region on the display panel, and is positioned in the first conductive layer or the second conductive layer or positioned in "flexible printed circuit (FPC)" or "printed circuit board (PCB)" of system. The switch cell is installed on the display panel. The switch cell comprises a liquid crystal layer, a first conductive layer, and a second conductive layer, where the first conductive layer comprises a first driving circuit, and the second conductive layer comprises a second driving circuit. The second driving circuit is for enabling a plurality of second enable lines coupled to the second driving circuit in groups according to the address signal. The first driving circuit is for enabling a plurality of first enable lines coupled to the first driving circuit in groups according to the address signal. The liquid crystal layer is located between the first conductive layer and the second conductive layer, and enables the plurality of first enable lines and the plurality of second enable lines in groups according to the address signal to control a portion of regions of the liquid crystal layer.

In another embodiment, a method of displaying 2D/3D regions in a liquid crystal display is described. The method includes: determining locations of at least one 2D region and at least one 3D region in a display panel according to image signals; generating an address signal according to the locations of the at least one 2D region and the at least one 3D region in the display panel; a second driving circuit enabling a plurality of second enable lines coupled to the second driving circuit in groups according to the address signal; and a first driving circuit enabling a plurality of first enable lines coupled to the first driving circuit in groups according to the address signal.

A liquid crystal display for displaying a 2D/3D region and related method are disclosed. The liquid crystal display and related method use a timing control circuit to generate an address signal according to locations the at least one 2D region and the at least one 3D region in the display panel. Then, second driving circuit enables a plurality of second enable lines coupled to the second driving circuit in groups according to the address signal, and the first driving circuit enables a plurality of first enable lines coupled to the first driving circuit in groups according to the address signal. Because the second driving circuit sequentially enables the plurality of second enable lines coupled to the second driving circuit in groups according to the address signal, number of scan signals of the second driving circuit is reduced over the prior art, so that voltage selection ratio of the display panel can be increased. Because the voltage selection ratio of the display panel is increased, the number of 3D regions of the switch cell can also be increased with gentle V-T curve.

Figure 3A:
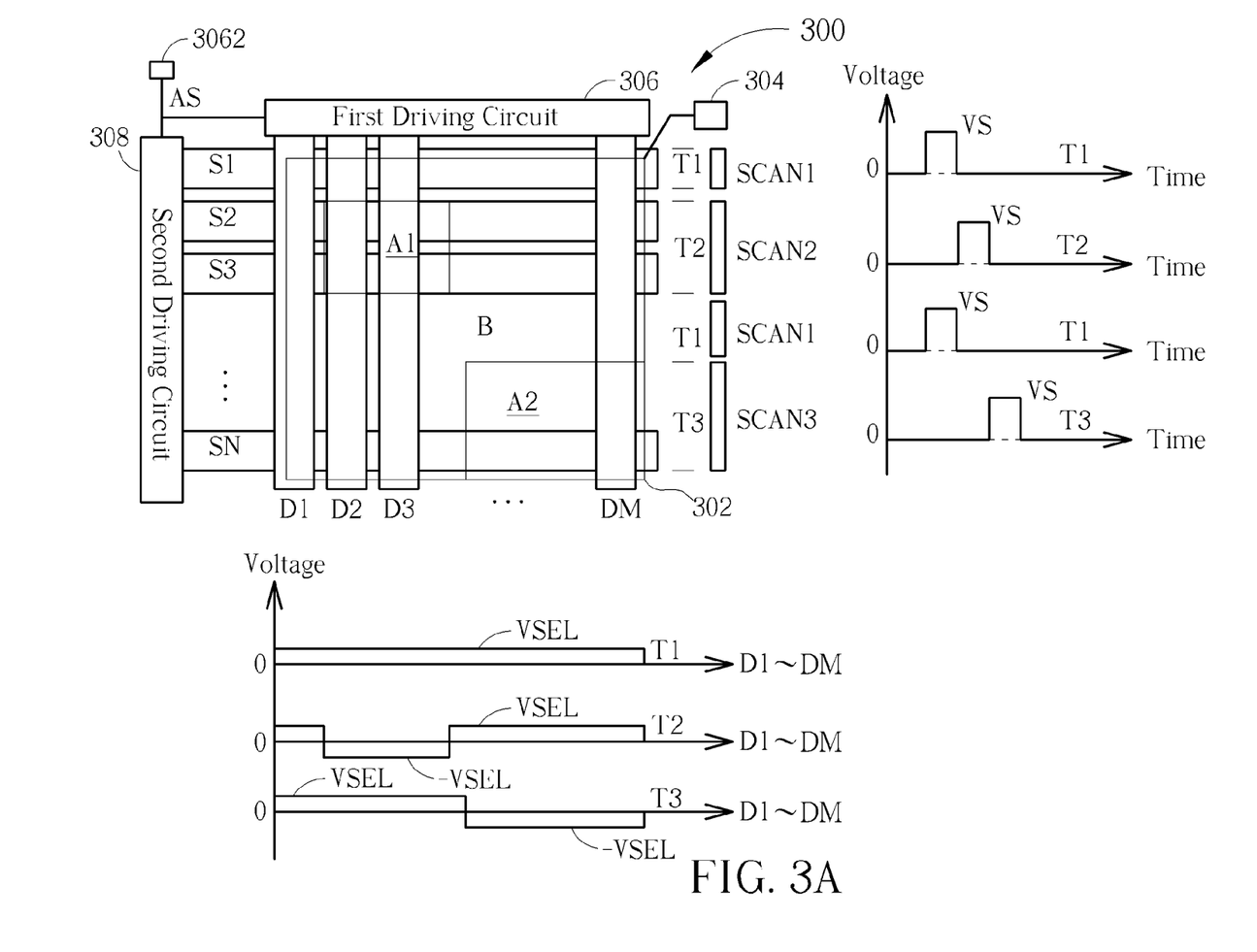
FIG. 3A is a diagram of a liquid crystal display for displaying a 2D/3D region.
Figure 3B:
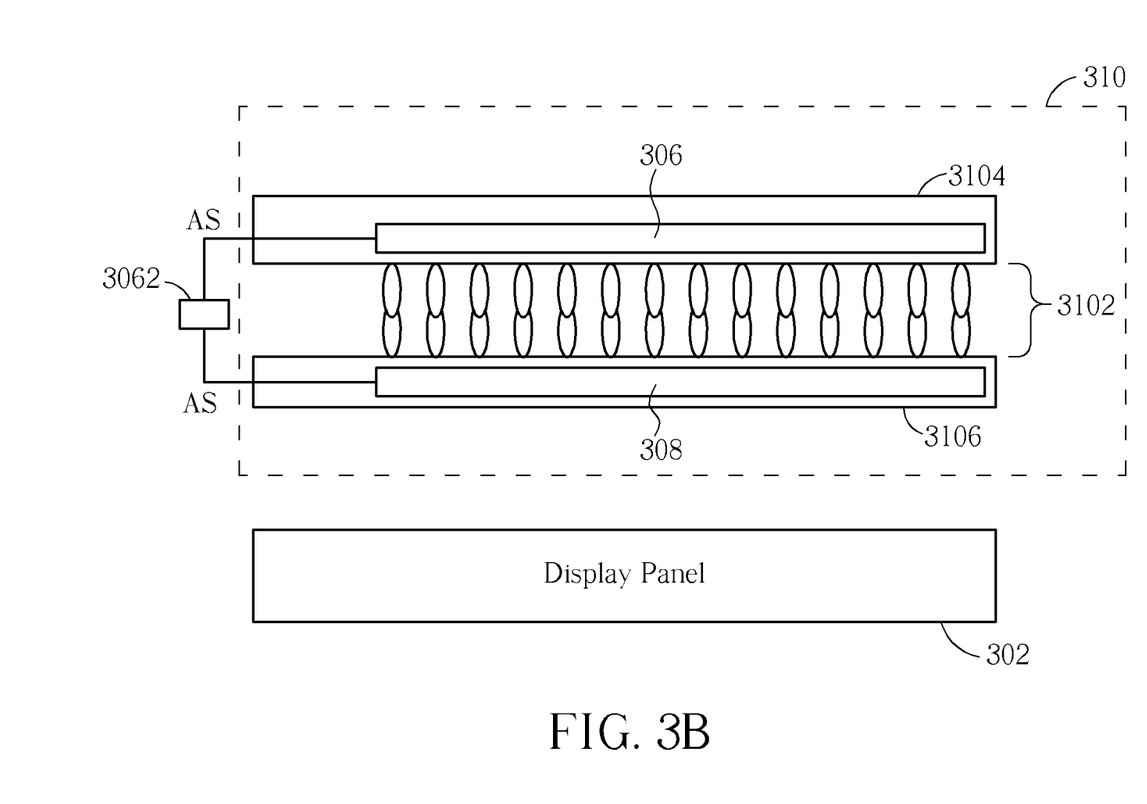
FIG. 3B is a diagram illustrating relationship between display panel and switch cell.

Please refer to FIG. 3A and FIG. 3B. FIG. 3A is a diagram of a liquid crystal display 300 for displaying a 2D/3D region. FIG. 3B is a diagram illustrating relationship between display panel 302 and switch cell 310. Liquid crystal display 300 comprises display panel 302, processor 304, timing control circuit 3062, and switch cell 310. Display panel 302 is used for receiving image signals, and displaying a 2D region (region B) and two 3D regions (regions A1 and A2) according to the image signals. However, the present embodiment is not limited to the display panel 302 displaying one 2D region and two 3D regions, but is only one example. Processor 304 is used for determining locations of 2D region (region B) and 3D regions (regions A1 and A2) in switch cell 310 according to the image signals, where processor 304 can be a video processor, a custom IC, or a central processing unit. As shown in FIG. 3B, switch cell 310 is installed on display panel 302, and comprises liquid crystal layer 3102, first conductive layer 3104 and second conductive layer 3106, where liquid crystal layer 3102 is located between first conductive layer 3104 and second conductive layer 3106. Additionally, as shown in FIG. 3B, first conductive layer 3104 comprises first driving circuit 306 and second conductive layer 3106 comprises second driving circuit 308. Liquid crystal layer 3102 is for controlling corresponding partial regions of liquid crystal layer 3102 according to first voltage VON corresponding to 3D regions and second voltage VOFF corresponding to 2D region when display panel 302 receives image signals. As shown in FIG. 3A, timing control circuit 3062 is used for generating address signal AS according to locations of 2D region (region B) and 3D regions (regions A1 and A2) on the display panel 302. Second driving circuit 308 is used for sequentially enabling a plurality of second enable lines S1-SN coupled to second driving circuit 308 in groups according to address signal AS, where N is a positive integer. First driving circuit 306 is used for sequentially enabling a plurality of first enable lines D1-DM coupled to first driving circuit 306 in groups according to address signal AS, where M is a positive integer. Thus, liquid crystal layer 3102 can sequentially enable the plurality of first enable lines and the plurality of second enable lines in groups to control corresponding partial regions of liquid crystal layer 3102 according to address signal AS. As shown in FIG. 3A, second driving circuit 308 groups the plurality of second enable lines S1-SN into three regions (SCAN1, SCAN2, SCAN3) for sequential enabling according to address signal AS, where region SCAN1 corresponds to time T1, region SCAN2 corresponds to time T2, and region SCAN3 corresponds to time T3. First driving circuit 306 is used for sequentially enabling a plurality of first enable lines D1-DM coupled to first driving circuit 306 in groups according to address signal AS, where M is a positive integer. As shown in FIG. 3A, when second driving circuit 308 enables second enable lines corresponding to region SCAN1, because region SCAN1 corresponds to 2D region (region B) of display panel 302, first driving circuit 306 inputs high voltage VSEL to first enable lines D1-DM. Likewise, when second driving circuit 308 enables second enable lines corresponding to region SCAN2, because region SCAN2 corresponds to 3D region (region A1) and 2D region (region B) of display panel 302, first driving circuit 306 inputs high voltage VSEL to first enable lines of first enable lines D1-DM corresponding to region B, and inputs low voltage −VSEL to first enable lines of first enable lines D1-DM corresponding to region A1. Likewise, when second driving circuit 308 enables second enable lines corresponding to region SCAN3, because region SCAN3 corresponds to 3D region (region A2) and 2D region (region B) of display panel 302, first driving circuit 306 inputs high voltage VSEL to first enable lines of first enable lines D1-DM corresponding to region B, and inputs low voltage −VSEL to first enable lines of first enable lines D1-DM corresponding to region A2. As shown in FIG. 3A, first voltage VON corresponding to region A1 and region A2 is root mean square of voltage difference between low voltage −VSEL and voltage VS enabling second enable lines S1-SN, and second voltage VOFF corresponding to region B is root mean square of voltage difference between high voltage VSEL and voltage VS enabling second enable lines S1-SN. As shown in FIG. 2C, because second driving circuit 308 groups the plurality of second enable lines S1-SN into three regions (SCAN1、SCAN2、SCAN3) according to address signal AS for sequential enabling (number of scan signals of second driving circuit 308 is reduced from N of the prior art to 3), voltage selection ratio (root mean square ratio of first voltage VON and second voltage VOFF) of switch cell 310 can be increased to 1.93. Thus, voltage selection ratio of switch cell 310 does not decrease with gentle V-T curve. Additionally, in another embodiment of FIG. 3A, region A1 and region A2 on switch cell 310 display 2D regions, and region B displays a 3D region. Operation of second driving circuit 308 and first driving circuit 306 is the same as that shown in FIG. 3A, namely high voltage VSEL is inputted to first enable lines corresponding to 2D region, and low voltage −VSEL is inputted to first enable lines corresponding to 3D region.

Figure 3C:
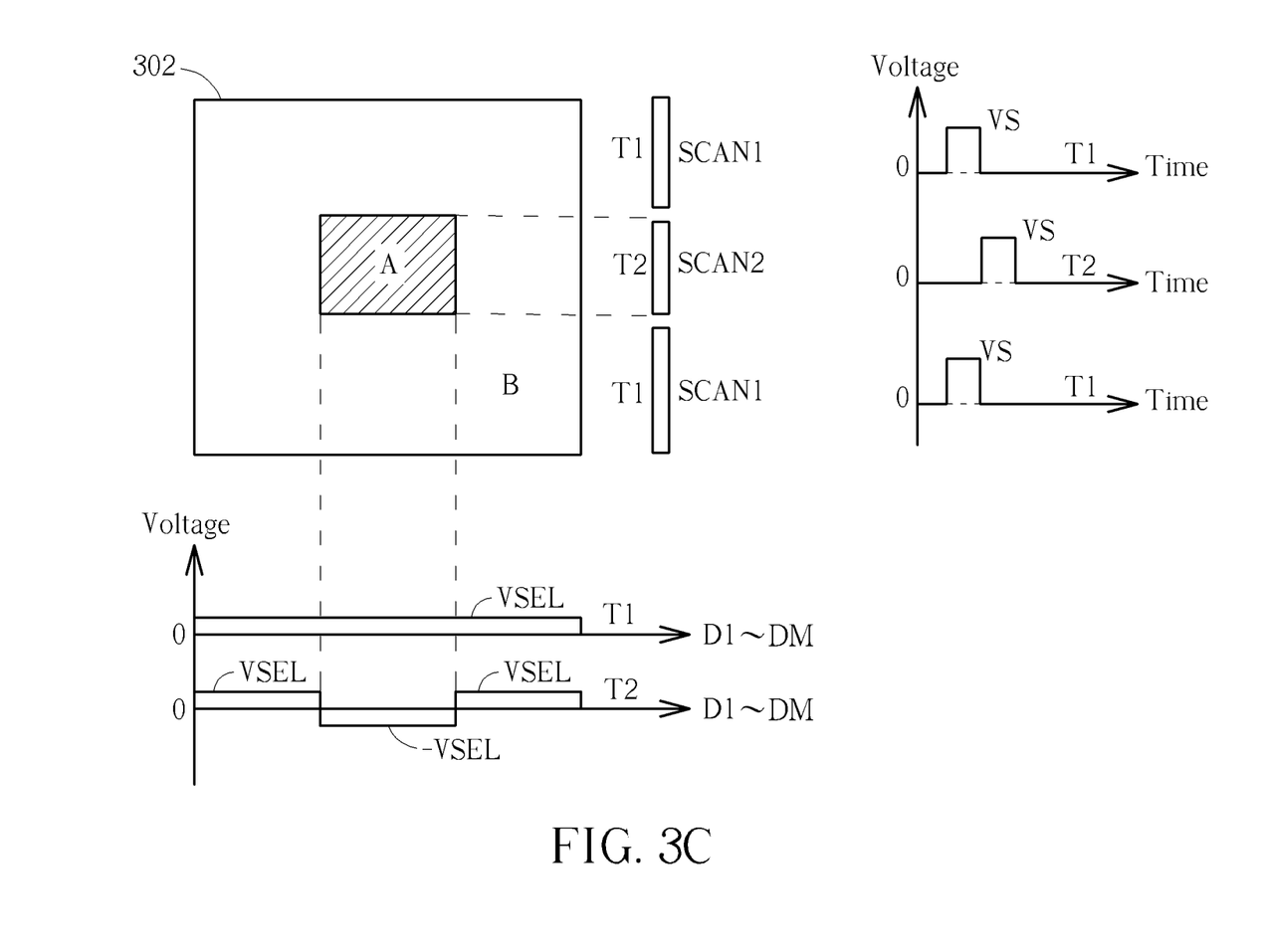
FIG. 3C illustrates switch cell displaying one 2D region (region B) and one 3D region (region A) according to image signals.
Figure 3D:
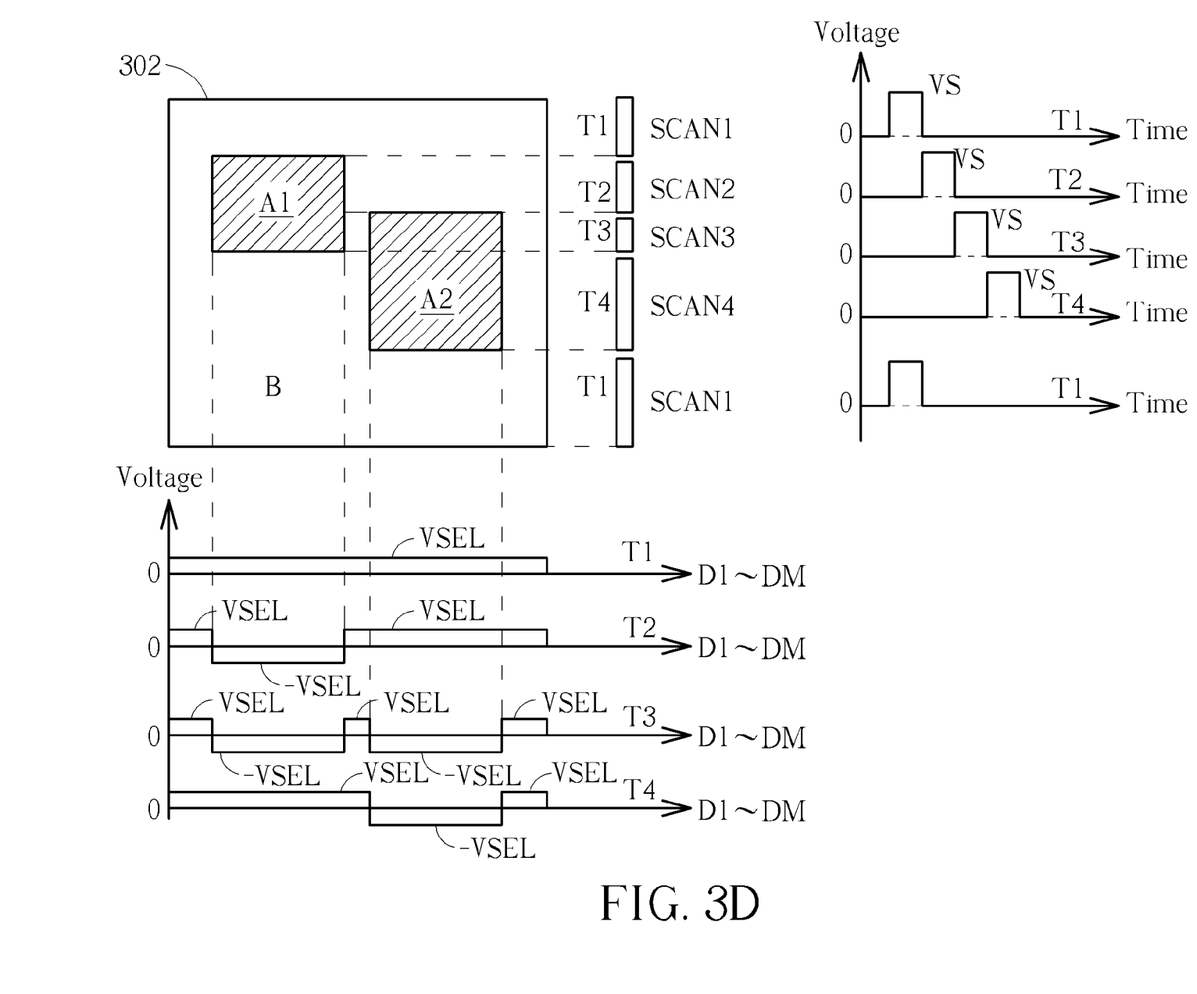
FIG. 3D illustrates switch cell displaying one 2D region (region B) and two 3D regions (region A1 and region A2) according to image signals.

Please refer to FIG. 3C and FIG. 3D. FIG. 3C illustrates switch cell 310 displaying one 2D region (region B) and one 3D region (region A) according to image signals. FIG. 3D illustrates switch cell 310 displaying one 2D region (region B) and two 3D regions (region A1 and region A2) according to image signals. As shown in FIG. 3C, second driving circuit 308 groups a plurality of second enable lines S1-SN into two groups (SCAN1、SCAN2) according to address signal AS for sequential enabling, where region SCAN1 corresponds to time T1 and region SCAN2 corresponds to time T2. When second driving circuit 308 enables second enable lines corresponding to region SCAN1, because region SCAN1 corresponds to 2D region (region B) of display panel 302, first driving circuit 306 inputs high voltage VSEL to first enable lines D1-DM. Likewise, when second driving circuit 308 enables second enable lines corresponding to region SCAN2, because region SCAN2 corresponds to 3D region (region A) and 2D region (region B) of display panel 302, first driving circuit 306 inputs high voltage VSEL to first enable lines of first enable lines D1-DM corresponding to region B, and inputs low voltage −VSEL to first enable lines of first enable lines D1-DM corresponding to region A. As shown in FIG. 3D, second driving circuit 308 groups the plurality of second enable lines S1-SN into four regions (SCAN1, SCAN2, SCAN3, SCAN4) according to address signal AS for sequential enabling, where region SCAN1 corresponds to time T1, region SCAN2 corresponds to time T2, region SCAN3 corresponds to time T3, and region SCAN4 corresponds to time T4. When second driving circuit 308 enables second enable lines corresponding to region SCAN1, because region SCAN1 corresponds to 2D region (region B) of display panel 302, first driving circuit 306 inputs high voltage VSEL to first enable lines D1-DM. Likewise, when second driving circuit 308 enables second enable lines corresponding to region SCAN2, because region SCAN2 corresponds to 3D region (region A1) and 2D region (region B) of display panel 302, first driving circuit 306 inputs high voltage VSEL to first enable lines of first enable lines D1-DM corresponding to region B, and inputs low voltage −VSEL to first enable lines of first enable lines D1-DM corresponding to region A1. Likewise, when second driving circuit 308 enables second enable lines corresponding to region SCAN3, because region SCAN3 corresponds to 3D regions (region A1, region A2) and 2D region (region B) of display panel 302, first driving circuit 306 inputs high voltage VSEL to first enable lines of first enable lines D1-DM corresponding to region B, and inputs low voltage −VSEL to first enable lines of first enable lines D1-DM corresponding to region A1 and region A2. Likewise, when second driving circuit 308 enables second enable lines corresponding to region SCAN4, because region SCAN4 corresponds to 3D region (region A2) and 2D region (region B) of display panel 302, first driving circuit 306 inputs high voltage VSEL to first enable lines of first enable lines D1-DM corresponding to region B, and inputs low voltage −VSEL to first enable lines of first enable lines D1-DM corresponding to region A2. Additionally, in another embodiment of FIG. 3C, region B of display panel 302 displays 3D region, and region A displays 2D region. Operation of second driving circuit 308 and first driving circuit 306 is the same as that of the embodiment of FIG. 3A, namely inputting high voltage VSEL to first enable lines corresponding to 2D region, and inputting low voltage −VSEL to first enable lines corresponding to 3D region. In another embodiment of FIG. 3D, region A1 and region A2 of display panel 302 display 2D region, and region B displays 3D region. Operation of second driving circuit 308 and first driving circuit 306 are the same as that in the embodiment of FIG. 3A, namely high voltage VSEL is inputted to first enable lines corresponding to 2D region, and low voltage −VSEL is inputted to first enable lines corresponding to 3D region.

Thus, in FIG. 3A, FIG. 3C, and FIG. 3D, a user does not need to use polarizing glasses to view one 2D region and at least one 3D region displayed by display panel 302.

Figure 4A:
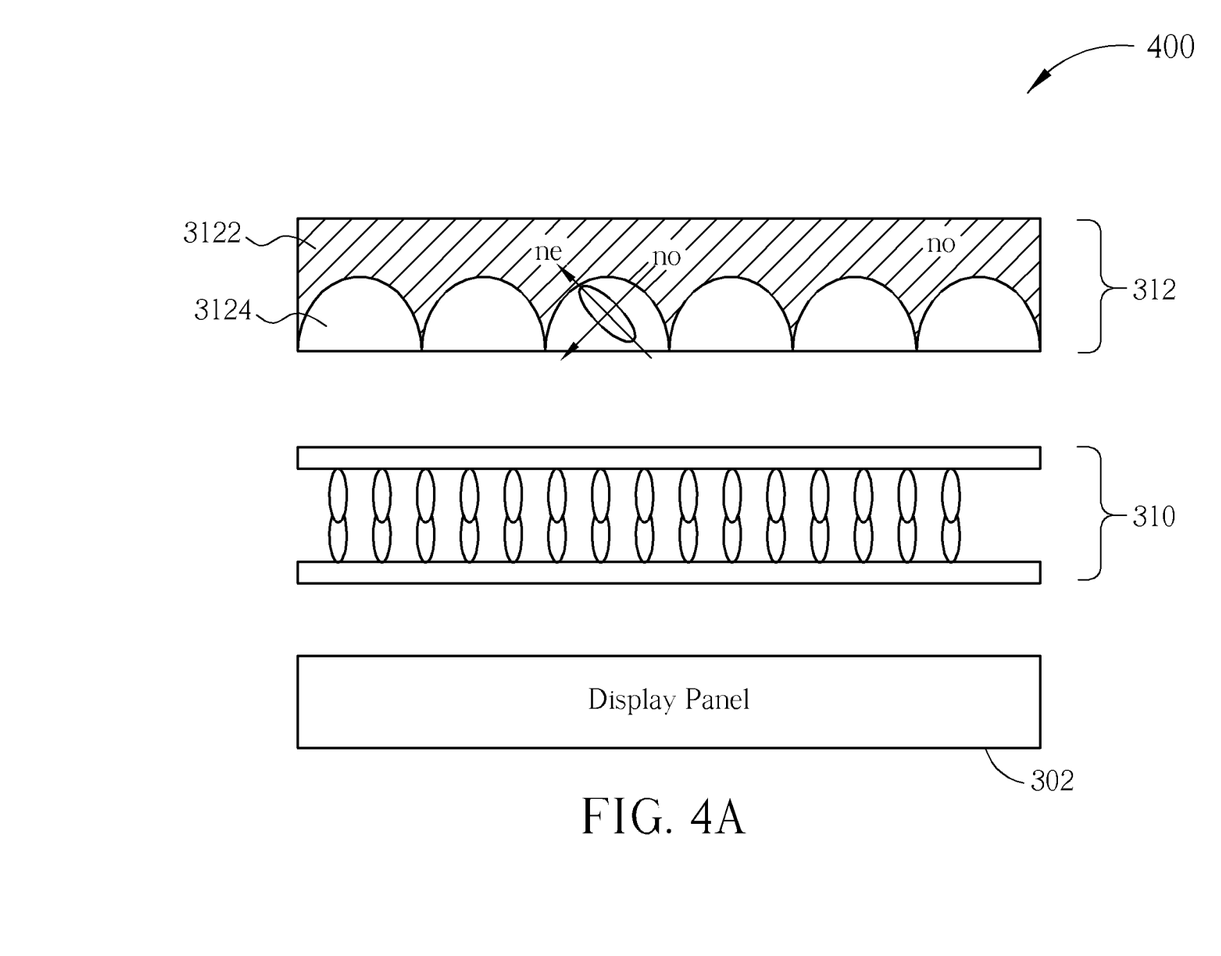
FIG. 4A is a diagram of a liquid crystal display according to an embodiment.
Figure 4B:
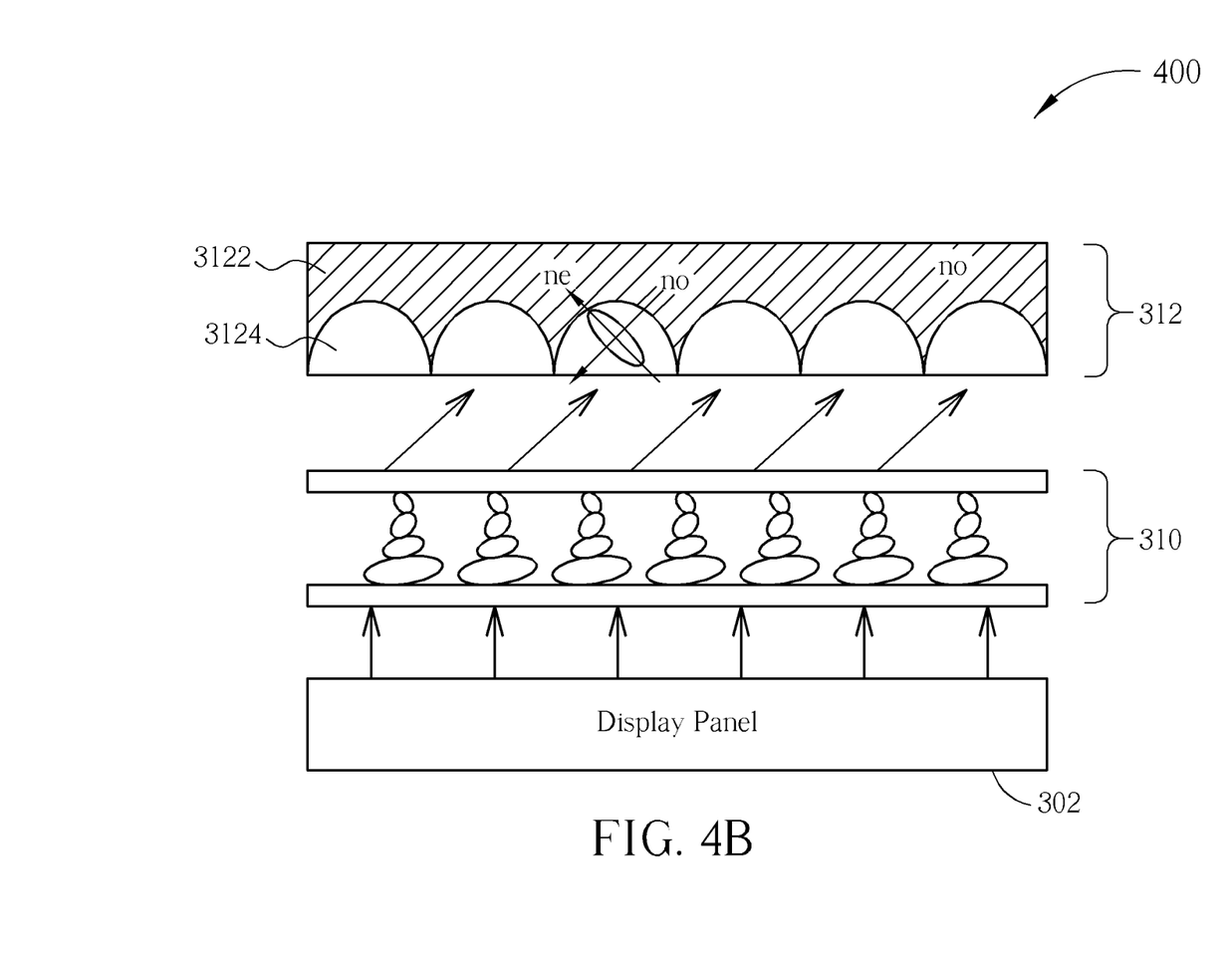
FIG. 4B illustrates switch cell controlling corresponding partial regions of liquid crystal layer according to second voltage corresponding to 2D region when liquid crystal display receives 2D region image signals.
Figure 4C:
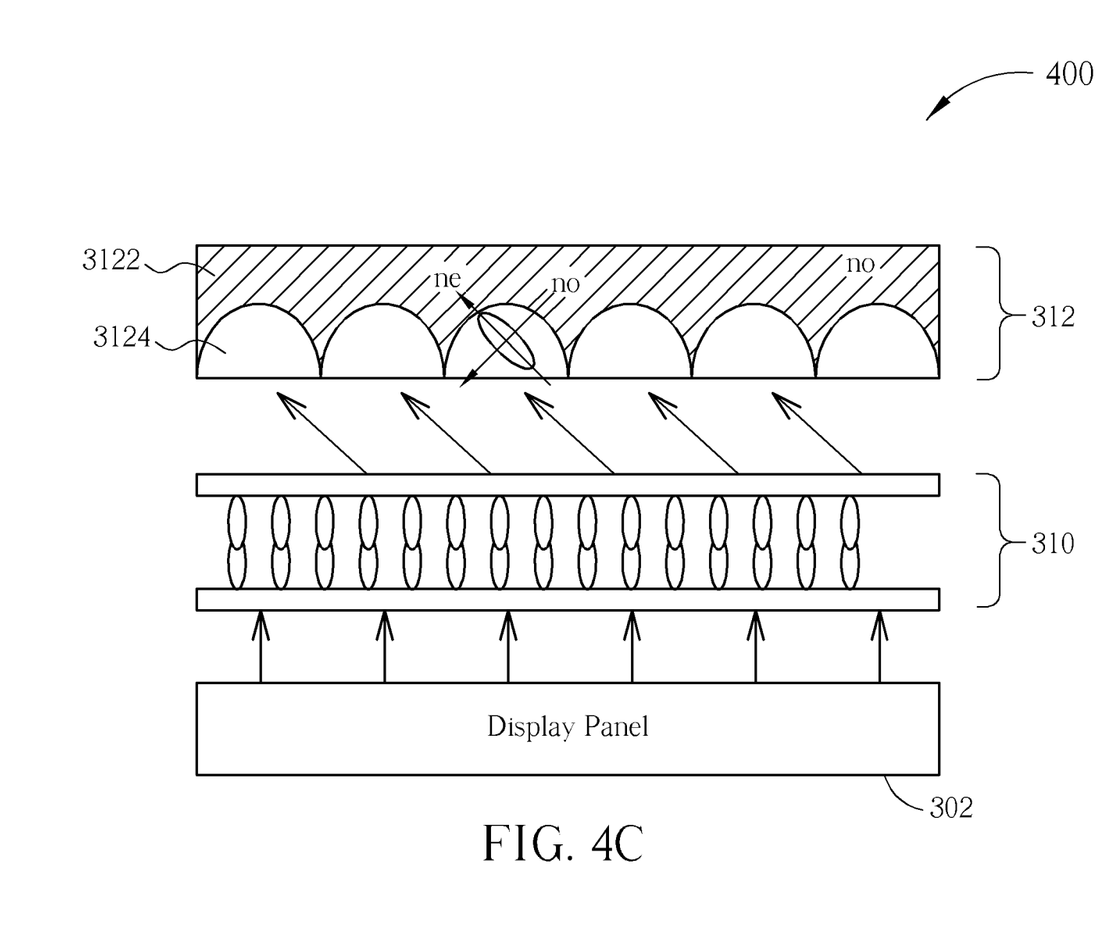
FIG. 4C illustrates switch cell controlling corresponding partial regions of liquid crystal layer according to first voltage corresponding to 3D region when liquid crystal display receives 3D region image signals.

Please refer to FIG. 4A and FIG. 3A. FIG. 4A is a diagram of a liquid crystal display 400 according to an embodiment. In FIG. 4A, liquid crystal display 400 further comprises refraction layer 312, thus liquid crystal display 400 is an automatic 3D display. Refraction layer 312 comprises UV glue layer 3122 and lenticular lens layer 3124. UV glue layer 3122 has a first refractive index no. Lenticular lens layer 3124 is installed below or above UV glue layer 3122. A first polarizing direction of lenticular lens layer 3124 has a first refractive index no, and a second polarizing direction of lenticular lens layer 3124 has a second refractive index ne. Additionally, switch cell 310 can be a twisted nematic liquid crystal or a super twisted nematic liquid crystal. Please refer to FIG. 4B and FIG. 4C. FIG. 4B illustrates switch cell 310 controlling corresponding partial regions of liquid crystal layer 3102 according to second voltage VOFF corresponding to 2D region when liquid crystal display 400 receives 2D region image signals. FIG. 4C illustrates switch cell 310 controlling corresponding partial regions of liquid crystal layer 3102 according to first voltage VON corresponding to 3D region when liquid crystal display 400 receives 3D region image signals. As shown in FIG. 4B, switch cell 310 controls corresponding partial regions of liquid crystal layer 3102 according to second voltage VOFF corresponding to 2D region. For example, when liquid crystal display 400 receives 2D region image signals, switch cell 310 controls corresponding partial regions of liquid crystal layer 3102 to 90° according to second voltage VOFF corresponding to 2D region. At that time, 2D region image signals displayed by display panel 302 are refracted by switch cell 312 to first polarization direction of lenticular lens layer 3124. Because first polarization direction of lenticular lens layer 3124 has first refractive index no, and UV glue layer 3122 also has the first refractive index no, a user sees 2D region image signals. Additionally, as shown in FIG. 4C, when liquid crystal display 400 receives 3D region image signals, switch cell 310 controls corresponding partial regions of liquid crystal layer 3102 to 0° according to first voltage VON corresponding to 3D region. At that time, 3D region image signals displayed by display panel 302 are refracted to second polarization direction of lenticular lens layer 3124 by switch cell 312. Because second polarization direction of lenticular lens layer 3124 has second refractive index ne, user sees 3D region image signals.

Figure 5:
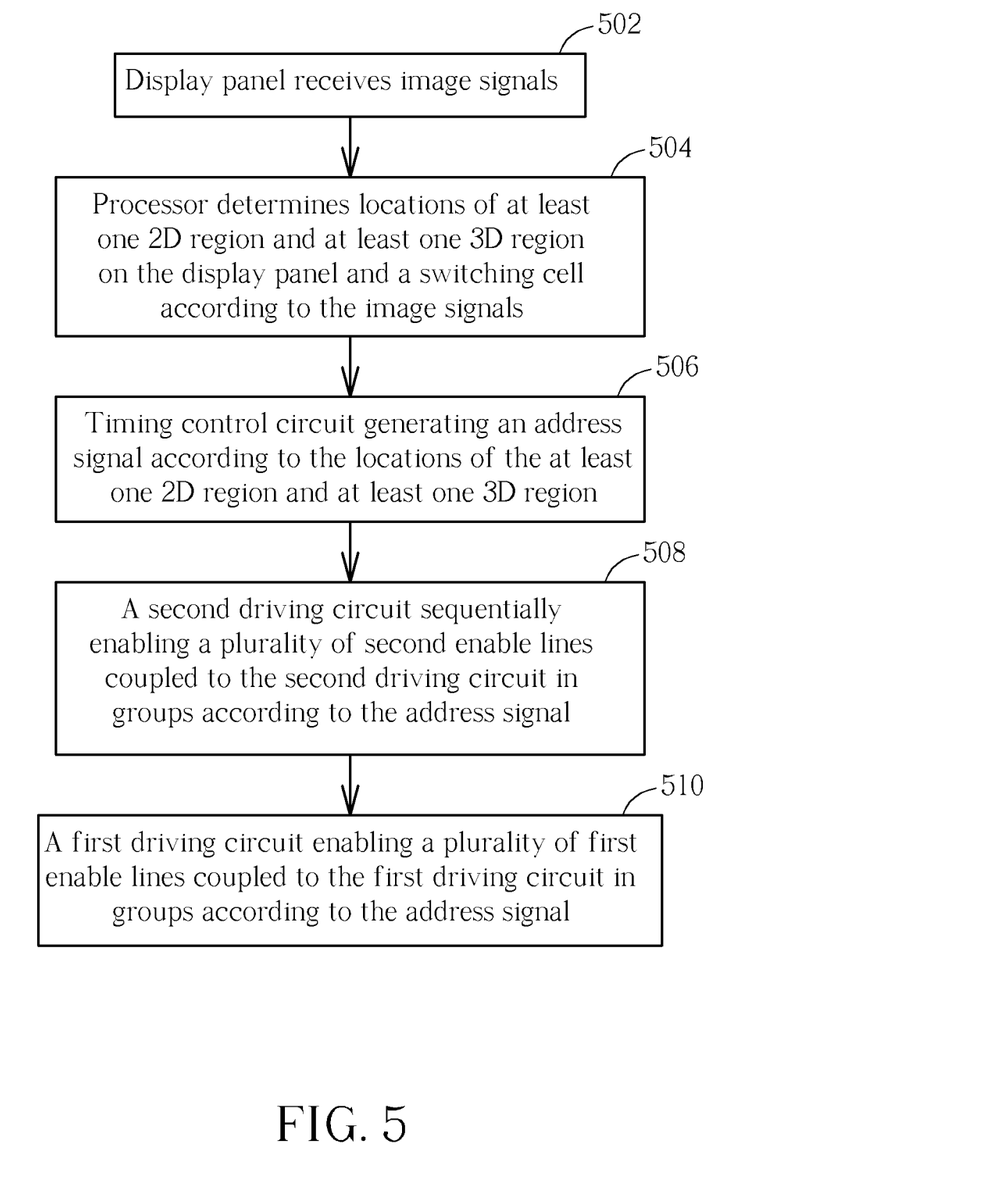
FIG. 5 is a flowchart of a method of adjusting a red-green-blue-white (RGBW) display system backlight according to an embodiment.

Please refer to FIG. 5. FIG. 5 is a flowchart of a method of adjusting a red-green-blue-white (RGBW) display system backlight according to an embodiment. The method of FIG. 5 is described with reference to liquid crystal display 300 of FIG. 3A, and comprises the following steps:

Step 502: Display panel 302 receives image signals;

Step 504: Processor 304 determines locations of at least one 2D region and at least one 3D region on display panel 302 and switch cell 310 according to image signals;

Step 506: Timing control circuit 3062 generates address signal AS according to locations of at least one 2D region and at least one 3D region on display panel 302;

Step 508: Second driving circuit 308 sequentially enables a plurality of second enable lines coupled to second driving circuit 308 in groups according to address signal AS; and Step 510: First driving circuit 306 sequentially enables a plurality of first enable lines coupled to first driving circuit 306 in groups according to address signal AS.

In step 504, processor 304 determines locations of at least one 2D region and at least one 3D region on display panel 302 according to image signals, e.g. in FIG. 3A, locations of 2D region (region B) and 3D regions (region A1 and region A2) on display panel 302, in FIG. 3C, locations of 2D region (region B) and 3D region (region A) on display panel 302, and in FIG. 3D, locations of 2D region (region B) and 3D regions (region A1 and region A2) on display panel 302. Processor 304 can be a video processor, a central processing unit, or a custom IC.

In step 508, second driving circuit 308 sequentially enables a plurality of second enable lines coupled to second driving circuit 308 in groups according to address signal AS. For example, in FIG. 3A, second driving circuit 308 groups the plurality of second enable lines into three regions (SCAN1, SCAN2, SCAN3) for sequential enabling according to address signal AS, where region SCAN1 corresponds to 2D region (region B) of display panel 302, region SCAN2 corresponds to 3D region (region A1) and 2D region (region B) of display panel 302, and region SCAN3 corresponds to 3D region (region A2) and 2D region (region B) of display panel 302. In FIG. 3C, second driving circuit 308 groups the plurality of second enable lines S1-SN into two regions (SCAN1, SCAN2) for sequential enabling according to address signal AS, where region SCAN1 corresponds to 2D region (region B) of display panel 302, and region SCAN2 corresponds to 3D region (region A) and 2D region (region B) of display panel 302. In FIG. 3D, second driving circuit 308 groups the plurality of second enable lines S1-SN into four regions (SCAN1, SCAN2, SCAN3, SCAN4) according to address signal AS for sequential enabling, where region SCAN1 corresponds to 2D region (region B) of display panel 302, region SCAN2 corresponds to 3D region (region A1) and 2D region (region B) of display panel 302, region SCAN3 corresponds to 3D regions (region A1, region A2) and 2D region (region B) of display panel 302, and region SCAN4 corresponds to 3D region (region A2) and 2D region (region B) of display panel 302.

In step 510, first driving circuit 306 enables a plurality of first enable lines coupled to first driving circuit 306 in groups according to address signal AS. For example, in FIG. 3A, when second driving circuit 308 enables second enable lines corresponding to region SCAN1, first driving circuit 306 inputs high voltage VSEL to first enable lines D1-DM. When second driving circuit 308 enables second enable lines corresponding to region SCAN2, first driving circuit 306 inputs high voltage VSEL to first enable lines of first enable lines D1-DM corresponding to region B, and inputs low voltage −VSEL to first enable lines of first enable lines D1-DM corresponding to region A1. When second driving circuit 308 enables second enable lines corresponding to region SCAN3, first driving circuit 306 inputs high voltage VSEL to first enable lines of first enable lines D1-DM corresponding to region B, and inputs low voltage −VSEL to first enable lines of first enable lines D1-DM corresponding to region A2. In FIG. 3C, when second driving circuit 308 enables second enable lines corresponding to region SCAN1, first driving circuit 306 inputs high voltage VSEL to first enable lines D1-DM. When second driving circuit 308 enables second enable lines corresponding to region SCAN2, first driving circuit 306 inputs high voltage VSEL to first enable lines of first enable lines D1-DM corresponding to region B, and inputs low voltage −VSEL to first enable lines of first enable lines D1-DM corresponding to region A. In FIG. 3D, when second driving circuit 308 enables second enable lines corresponding to region SCAN1, first driving circuit 306 inputs high voltage VSEL to first enable lines D1-DM. When second driving circuit 308 enables second enable lines corresponding to region SCAN2, first driving circuit 306 inputs high voltage VSEL to first enable lines of first enable lines D1-DM corresponding to region B, and inputs low voltage −VSEL to first enable lines of first enable lines D1-DM corresponding to region A1. When second driving circuit 308 enables second enable lines corresponding to region SCAN3, first driving circuit 306 inputs high voltage VSEL to first enable lines of first enable lines D1-DM corresponding to region B, and inputs low voltage −VSEL to first enable lines of first enable lines D1-DM corresponding to region A1 and region A2. When second driving circuit 308 enables second enable lines corresponding to region SCAN4, first driving circuit 306 inputs high voltage VSEL to first enable lines of first enable lines D1-DM corresponding to region B, and inputs low voltage −VSEL to first enable lines of first enable lines D1-DM corresponding to region A2.

In summary, the liquid crystal display for displaying 2D/3D regions and related method utilize timing control circuit to generate address signal according to locations of at least one 2D region and at least one 3D region on display panel. Then, second driving circuit sequentially enables a plurality of second enable lines coupled to second driving circuit in groups according to address signal, and first driving circuit enables a plurality of first enable lines coupled to first driving circuit in groups according to address signal. Because second driving circuit sequentially enables the plurality of second enable lines coupled to the second driving circuit in groups according to the address signal, number of scan signals of the second driving circuit is lower than the number of scan signals used in the prior art, such that voltage selection ratio of the display panel can be increased. Because voltage selection ratio of the display panel is increased, the number of 3D regions of the switch cell can also be increased with gentle V-T curve. For inversion driving methods (AC waveform, alternating current waveform) the polarity of former voltages can be inverted sequentially for reliability of liquid crystal.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A liquid crystal display (LCD) for displaying two-dimensional/three-dimensional (2D/3D) images, comprising:
   a display panel for receiving an image signal, and displaying at least one 2D region and at least one 3D region according to the image signal;
   a processor for determining positions of the at least one 2D region and the at least one 3D region on the display panel according to the image signal;
   a timing control circuit for generating an address signal according to the positions of the at least one 2D region and the at least one 3D region on the display panel; and
   a switch cell layer installed on the display panel, the switch cell layer comprising:
      a liquid crystal layer;
      a first conductive layer comprising a first driving circuit for enabling a plurality of first enable lines coupled to the first driving circuit in groups according to the address signal; and
      a second conductive layer comprising a second driving circuit for enabling a plurality of second enable lines coupled to the second driving circuit in groups according to the address signal;
   wherein the liquid crystal layer is positioned between the first conductive layer and the second conductive layer, the second driving circuit organizes the second enable lines in several groups according to the positions of the at least one 2D region and the at least one 3D region and enables the groups of second enable lines in a consecutive sequence, all second enable lines of each of the groups of second enable lines are enabled synchronously, and different groups of the second enable lines are enabled asynchronously, and when enabling a group of second enable lines having a corresponding 2D region and a corresponding 3D region, the first driving circuit outputs a first voltage to first enable lines corresponding to the 3D region and outputs a second voltage to first enable lines corresponding to the 2D region, the second voltage being different from the first voltage.

2. The LCD of claim 1, further comprising:
   a refraction layer installed on the switch cell layer, the refraction layer comprising:
      an ultraviolet (UV) glue layer having a first refractive index; and
      a lenticular lens layer installed under the UV glue layer, a first polarizing direction of the lenticular lens having the first refractive index, and a second polarizing direction of the lenticular lens having a second refractive index.

3. The LCD of claim 1, wherein the first voltage corresponding to the at least one 3D region is the root mean square of voltage difference of voltage for the second driving circuit to enable a second enable line and low voltage inputted into a first enable line by the first driving circuit; and the second voltage corresponding to the at least one 2D region is the root mean square of voltage difference of voltage for the second driving circuit to enable another second enable line and high voltage inputted into another first enable line by the first driving circuit.

4. The LCD of claim 3, wherein the ratio of the first voltage and the second voltage determines the number of 3D regions.

5. The LCD of claim 1, wherein the second driving circuit synchronously enables second enable lines corresponding to a 2D region, and synchronously enables second enable lines corresponding to a 3D region and the 2D region.

6. The LCD of claim 5, wherein the first driving circuit inputs a high voltage to the plurality of first enable lines when the second driving circuit synchronously enables the second enable lines corresponding to the 2D region, and the first driving circuit inputs the high voltage to the first enable lines corresponding to the 2D region, and inputs a low voltage to the first enable lines corresponding to the 3D region when the second driving circuit synchronously enables the second enable lines corresponding to the 3D region and the 2D region.

7. The LCD of claim 1, wherein the second driving circuit synchronously enables second enable lines corresponding to a 2D region, synchronously enables second enable lines corresponding to a first 3D region and the 2D region, and synchronously enables second enable lines corresponding to a second 3D region and the 2D region.

8. The LCD of claim 7, wherein the first driving circuit inputs a high voltage to the plurality of first enable lines when the second driving circuit synchronously enables the second enable lines corresponding to the 2D region, the first driving circuit inputs the high voltage to first enable lines corresponding to the 2D region and inputs a low voltage to first enable lines corresponding to the first 3D region when the second driving circuit synchronously enables the second enable lines corresponding to the first 3D region and the 2D region, and the first driving circuit inputs the high voltage to first enable lines corresponding to the 2D region and inputs the low voltage to first enable lines corresponding to the second 3D region when the second driving circuit synchronously enables second enable lines corresponding to the second 3D region and the 2D region.

9. The LCD of claim 1, wherein the second driving circuit synchronously enables second enable lines corresponding to a 2D region, synchronously enables second enable lines corresponding to a first 3D region and the 2D region, synchronously enables second enable lines corresponding to a second 3D region, the first 3D region, and the 2D region, and synchronously enables second enable lines corresponding to the second 3D region and the 2D region.

10. The LCD of claim 9, wherein the first driving circuit inputs a high voltage to the plurality of first enable lines when the second driving circuit synchronously enables second enable lines corresponding to the 2D region, the first driving circuit inputs the high voltage to first enable lines corresponding to the 2D region and inputs a low voltage to first enable lines corresponding to the first 3D region when the second driving circuit synchronously enables second enable lines corresponding to the first 3D region and the 2D region, the first driving circuit inputs the high voltage to first enable lines corresponding to the 2D region and inputs the low voltage to first enable lines corresponding to the first 3D region and the second 3D region when the second driving circuit synchronously enables second enable lines corresponding to the second 3D region, the first 3D region and 2D region, and the first driving circuit inputs the high voltage to first enable lines corresponding to the 2D region and inputs the low voltage to first enable lines corresponding to the second 3D region when the second driving circuit synchronously enables second enable lines corresponding to the second 3D region and the 2D region.

11. The LCD of claim 1, wherein the timing control circuit is positioned in the first conductive layer or the second conductive layer or positioned in "flexible printed circuit (FPC)" or "printed circuit board (PCB)" of system.

12. The LCD of claim 1, wherein the plurality of second enable lines of the same group comprise a plurality of sections separated by at least one other different group.

13. A method of displaying 2D/3D images in an LCD, comprising:
  receiving an image signal;
  determining positions of at least one 2D region and at least one 3D region on a display panel according to the image signal;
  generating an address signal according to the positions of the at least one 2D region and the at least one 3D region on the display panel;
  organizing second enable lines in several groups according to the positions of the at least one 2D region and the at least one 3D region;
  enabling the groups of second enable lines in a consecutive sequence by a second driving circuit; and
  when enabling a group of second enable lines having a corresponding 2D region and a corresponding 3D region, inputting a first voltage to first enable lines corresponding to the 3D region and inputting a second voltage to first enable lines corresponding to the 2D region by a first driving circuit;
  wherein second enable lines of each of the groups are enabled synchronously, different groups of second enable lines are enabled asynchronously, and the second voltage is different from the first voltage.

14. The method of claim 13, wherein enabling the groups of second enable lines in a consecutive sequence by the second driving circuit comprises enabling only second enable lines corresponding to the at least one 2D region, only second enable lines corresponding to the at least one 3D region, and/or second enable lines corresponding to the at least one 2D region and the at least one 3D region by the second driving circuit.

15. The method of claim 14, further comprising inputting a high voltage to the plurality of first enable lines when the second driving circuit enables only the second enable lines corresponding to the at least one 2D region by the first driving circuit.

16. The method of claim 14, further comprising inputting a low voltage to the plurality of first enable lines when the second driving circuit enables only the second enable lines corresponding to the at least one 3D region by the first driving circuit.

17. The method of claim 14, further comprising
  inputting a high voltage to first enable lines corresponding to the at least one 2D region and inputting a low voltage to first enable lines corresponding to the at least one 3D region by the first driving circuit when the second driving circuit enables the second enable lines corresponding to the at least one 2D region and the at least one 3D region.

18. The method of claim 13, wherein generating the address signal according to the positions of the at least one 2D region and the at least one 3D region on the display panel is generating the address signal according to the positions of the at least one 2D region and the at least one 3D region on the display panel by a timing control circuit comprised by the first driving circuit.

19. The method of claim 13, wherein the plurality of second enable lines of the same group comprise a plurality of sections separated by at least one other different group.

* * * * *